United States Patent Office 3,453,828
Patented July 8, 1969

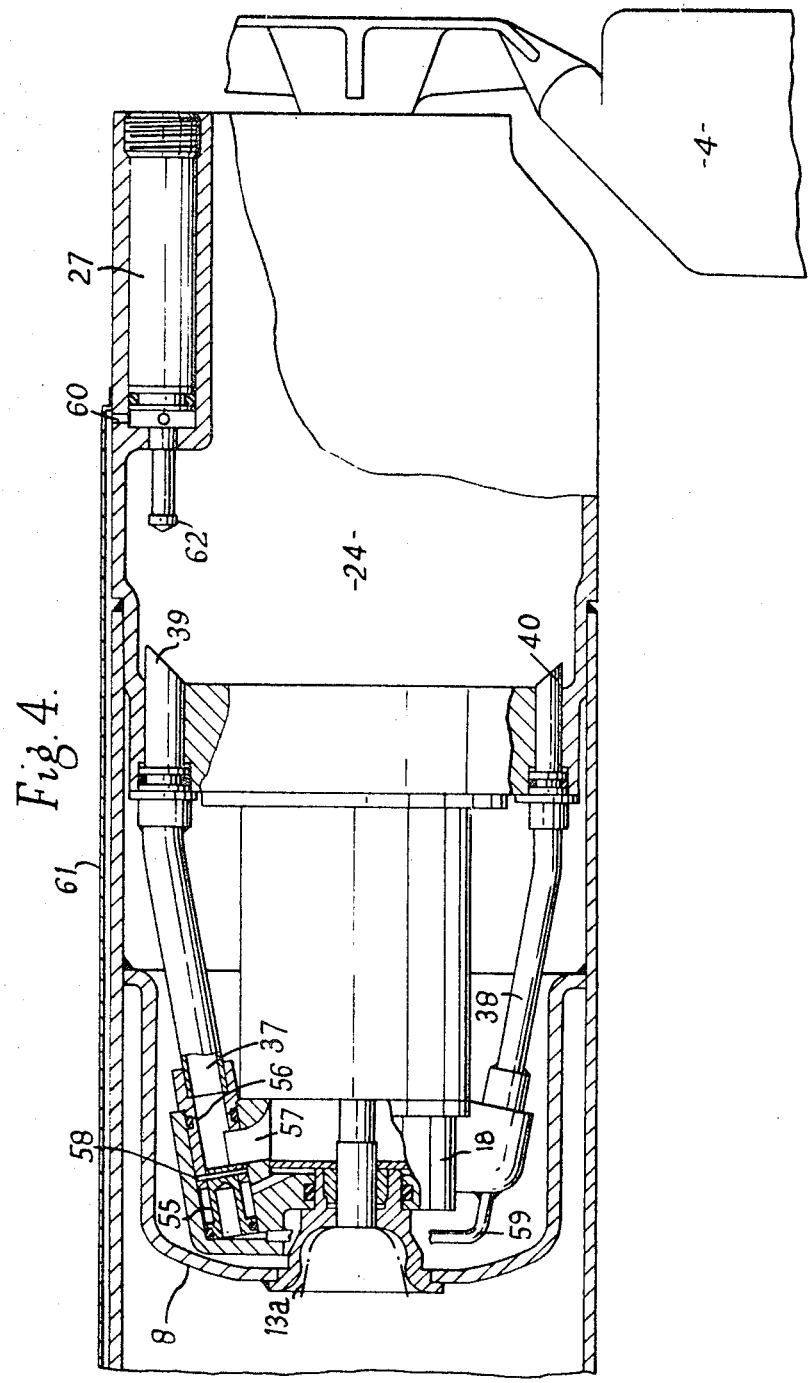

3,453,828
ROCKET PROPULSION UNIT FOR OPERATION BY LIQUID MONOFUEL
Dennis G. Rawlings, Fareham, England, assignor to The Plessey Company Limited, Ilford, England, a British company
Filed Feb. 16, 1967, Ser. No. 616,596
Claims priority, application Great Britain, Mar. 1, 1966, 9,030/66
Int. Cl. F02k 9/02
U.S. Cl. 60—259     14 Claims

ABSTRACT OF THE DISCLOSURE

In order to provide a rocket unit having low light emission and reasonable fuel economy, a liquid monofuel is fed to a decomposition chamber at a higher rate during an initial acceleration stage and at a much lower rate during a subsequent cruising stage thus still having available during the latter some thrust for steering purposes and some shaft and/or hydraulic power for control and like purposes, reliable combustion in the latter stage being ensured by switching off a larger-capacity atomiser nozzle and reducing the thrust-nozzle access. The application includes means for doing this and cartridge starting means in which cartridge gases are kept clear of the decomposition chamber, which is pressurised by hot-spot ignited monofuel burned with the air content of chamber preceding pressure decomposition. Also described is a hydraulic steering unit which swivels a combined nozzle-and-fin unit in two mutually perpendicular planes.

---

Figure 1:
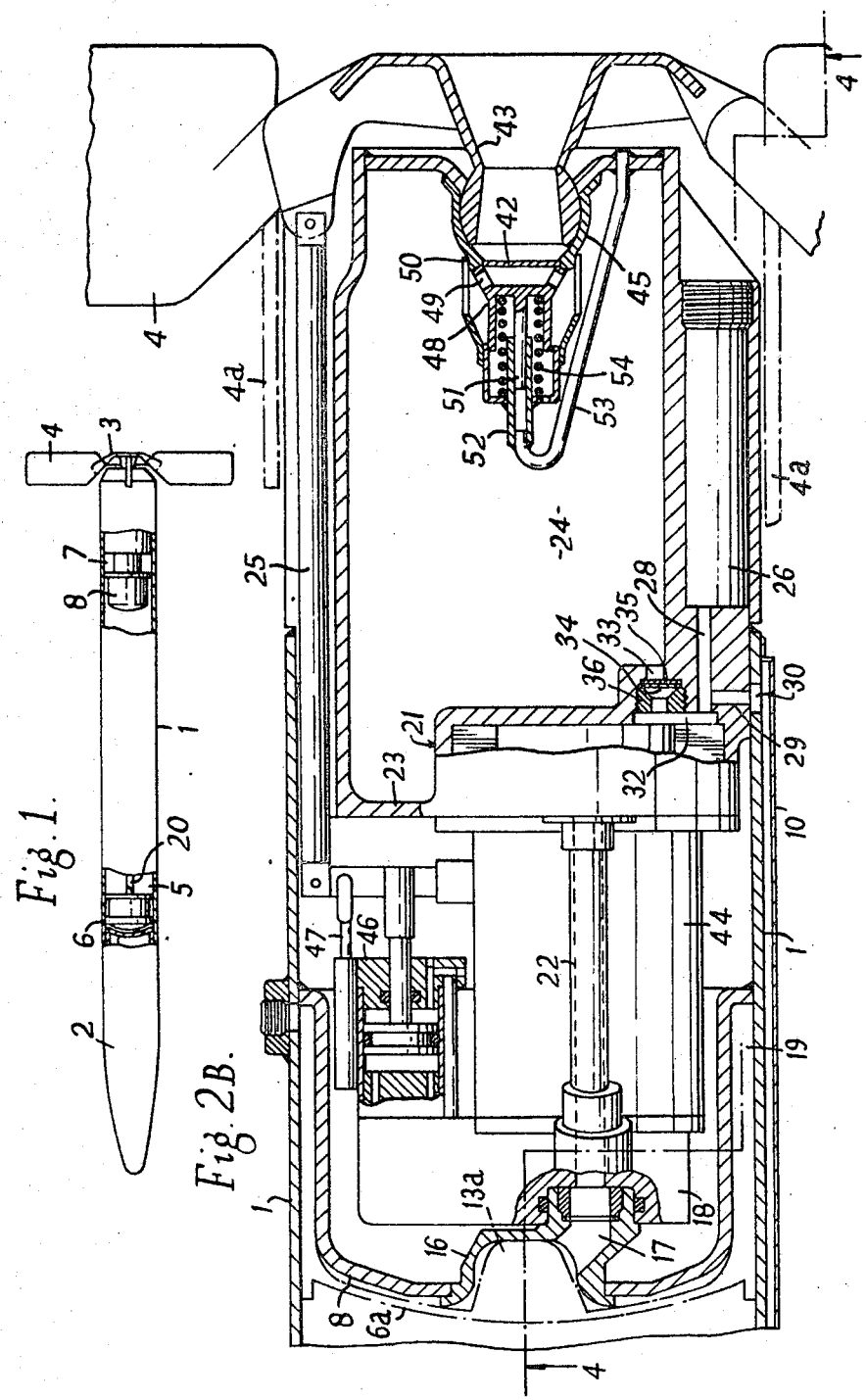

This invention relates to rocket propulsion units and has for an object to provide an impoved rocket propulsion unit suitable for operation with a liquid monofuel.

The use of the generally employed solid rocket propellants for visually controlled rockets is liable to suffer from a number of difficulties. Thus for example the brightness of the combustion flame emitted is liable to interfere with the accurate visual location from the ground of the rocket in flight. Moreover, in view of the fact that for fuel-economy reasons it is desirable to compress the acceleration into a short period at the beginning of the travel, no jet reaction and no gas pressure are normally available for correcting the flight path after the termination of this short initial period. The present invention proposes to employ as the propellant a liquid monofuel, for example isopropyl nitrate, whose oxidising decomposition as a monofuel, without the admixture of air, involves very much less emission of light and develops a thrust which can be regulated by controlling the admission of the monofuel to the decomposition chamber in such a manner that, while a high thrust is developed for a short period at the beginning of the travel of the rocket, decomposition is maintained at a reduced rate, sufficient for steering and other auxiliary purposes, throughout the length of the visually observable rocket flight.

The invention in a broad aspect thus consists in a rocket propulsion unit which comprises a storage reservoir for liquid monofuel, a decomposition chamber, means for injecting monofuel from the reservoir into the decomposition chamber and for initially pressurizing the decomposition chamber by igniting the monofuel in the air present in that chamber, a propulsion nozzle for the emission of combustion and decomposition gases from the said chamber, in conjunction with means which prevent the flow of gases from the decomposition chamber to the nozzle until the initial combustion in that chamber has produced a pressure sufficient to maintain combustive decomposition in the chamber, and means operative after an initial acceleration period of the rocket to reduce the rate of monofuel supply to the decomposition chamber to a fraction of the previous rate of supply, such fraction being at least sufficient to permit the performance of steering operations and to supply any auxiliary power required. Such auxiliary power supply may include, for example, an electric generator driven by a gas turbine supplied with operating gas from the decomposition chamber. When the reduction in the monofuel supply rate is so great that the decomposition of the reduced amount of monofuel would be insufficient to maintain reliable decomposition conditions in the chamber with the use of the same jet nozzle aperture that is employed in the initial stage, further means are arranged to come into operation when the rate of monofuel supply is thus reduced, and which reduce the effective jet-nozzle aperture either by cutting off the supply to one or more of a number of jet nozzles or, as at present preferred, by interposing a restriction between the decomposition chamber and the nozzle inlet of the jet nozzle.

The means for injecting monofuel from the reservoir into the decomposition chamber preferably include a dynamic pump, for example a Barske pump, driven by a gas turbine. While monofuel is decomposed, this turbine is driven by gases from the decomposition chamber. A pressurising follower piston in the reservoir is during this period loaded at its outer side by pressure from the chamber. In order to initiate the supply of fuel to the decomposition chamber, a starter cartridge is so arranged in the rocket unit that when ignited it supplies combustion gases to the turbine and to the pressure-loading chamber at the outer side of the follower piston provided in the monofuel reservoir. In order to avoid contamination of the decomposition chamber by combustion gas from the starter cartridge charge, a one-way locking device is preferably interposed between the gas-turbine inlet and the decomposition chamber to prevent flow into the decomposition chamber but permit flow from that chamber to the gas turbine when the pressure in the decomposition chamber reaches the necessary height. This one-way device may comprise a disc of frangible material which is supported by a grid against pressure acting on the side facing the turbine inlet but is only supported at its edge against movement in the opposite direction, so that excess pressure on the decomposition chamber will fracture the disc. When monofuel supplied by the turbine-driven pump first reaches the decomposition chamber, it will find the chamber filled with air under atmospheric pressure. A hot-spot ignition device, preferably heated by a second cartridge of a hot type, is therefore provided to initiate combustion of monofuel under these conditions. This combustion of monofuel with air will rapidly cause the pressure in the decomposition chamber to rise sufficiently for combustive decomposition of the monofuel to take place, for which no further air supply is required. A bursting disc is provided in the passage from the decomposition chamber to the propulsion nozzle. This disc prevents during this initial period escape of gases from the chamber to the nozzle but will burst and be ejected as soon as the conditions for combustive decomposition of the monofuel, and thus for normal rocket propulsion are reached. When the starting cartridge has burnt out and the pressure in the turbine inlet therefore falls below decomposition-chamber pressure, the frangible disc in the connection between the decomposition chamber and the gas-turbine inlet will also burst, so that gas from the decomposition chamber will ensure the continued operation of the gas turbine driving the pump. This gas turbine is conveniently also employed to drive an electric generator which, compared with an electric battery, gives the unit a much extended store life.

According to a preferred feature of the invention the movement of the follower piston along the monofuel reservoir is utilised for controlling the change-over from the initial, rapid rate of monofuel injection into the decomposition chamber to a slower rate of injection after the end of the acceleration period. For this purpose the pressurising piston is preferably equipped at its side facing the monofuel with a spring-loaded stereoscopically collapsible abutment rod which when the follower piston reaches a predetermined position, co-operates with a valve seat to restrict the admission of monofuel to the inlet of the turbine-driven centrifugal pump so that only a correspondingly smaller amount of fuel will be admitted to the pump, causing the pump delivery to decrease similarly. In order to allow this decrease to be made so great that, with the original propulsion nozzle, the pressure in the combustion chamber would become insufficient for combustive decomposition of the monofuel, an automatic restrictor device is arranged to reduce the propulsion-nozzle inlet area before the drop in chamber pressure is sufficient to produce such risk. This change-over is preferably effected by means of an obturator member which co-operates with a nozzle-inlet aperture, and which is spring-urged to the smaller-area position, but is at the beginning of the high-rate operation moved to the larger-area position against the spring pressure by the action, on a small cross-sectional area, of the decomposition-chamber pressure against atmospheric pressure, the pressure at which the change-over to the smaller nozzle inlet area takes place being determined by the loading of the spring.

Difficulties might further arise in the effective atomisation of the fuel if one and the same injection nozzle were utilised for the fuel supply at two widely differing rates. The invention therefore preferably provides for the respective operation of different injection nozzle systems when fuel is supplied at the higher and the lower rate respectively. Preferably the fuel supply at the lower rate is effected through one or some only of a number of injection nozzles which are jointly used when fuel is supplied at the higher rate, and the remainder of which are cut off from the fuel supply when the rate of fuel supply is reduced. This is preferred because in this case the first-mentioned nozzle or nozzles, by having been in operation throughout the initial period of high fuel delivery, are effectively protected from contamination by deposits of combustion residues during this initial period, which otherwise might impair the nozzle operation in the low-delivery period. The closing of the remainder of the nozzles during the latter period is preferably effected hydraulically, utilising the sudden pressure alterations occurring upon reduction of the pump-inlet area. It is believed that if the pump outlets respectively leading to the small, permanently operated nozzle and to the large nozzle employed only during the initial acceleration period, are sufficiently spaced from each other on the circumference of the pump, the rapid reduction of the pump-inlet area will cause the pressure at the large-area pump outlet to drop more rapidly than that at the small-area pump outlet, and the resulting pressure difference is preferably utilised to effect the cutting-off of the large-area outlet, the arrangement being such that once in the cut-off position, the cut-off member will be automatically retained in this position by the pump-delivery pressure.

Reduction of the pump-inlet area is conveniently effected by a plug carried on a telescopically collapsible spring-loaded pillar which extends from the centre of the follower piston, and whose spring load is just sufficient to normally maintain the distance between the plug and the piston but will oppose little resistance to the further movement of the piston when the plug is seated and is thus prevented from further movement.

Figure 2:
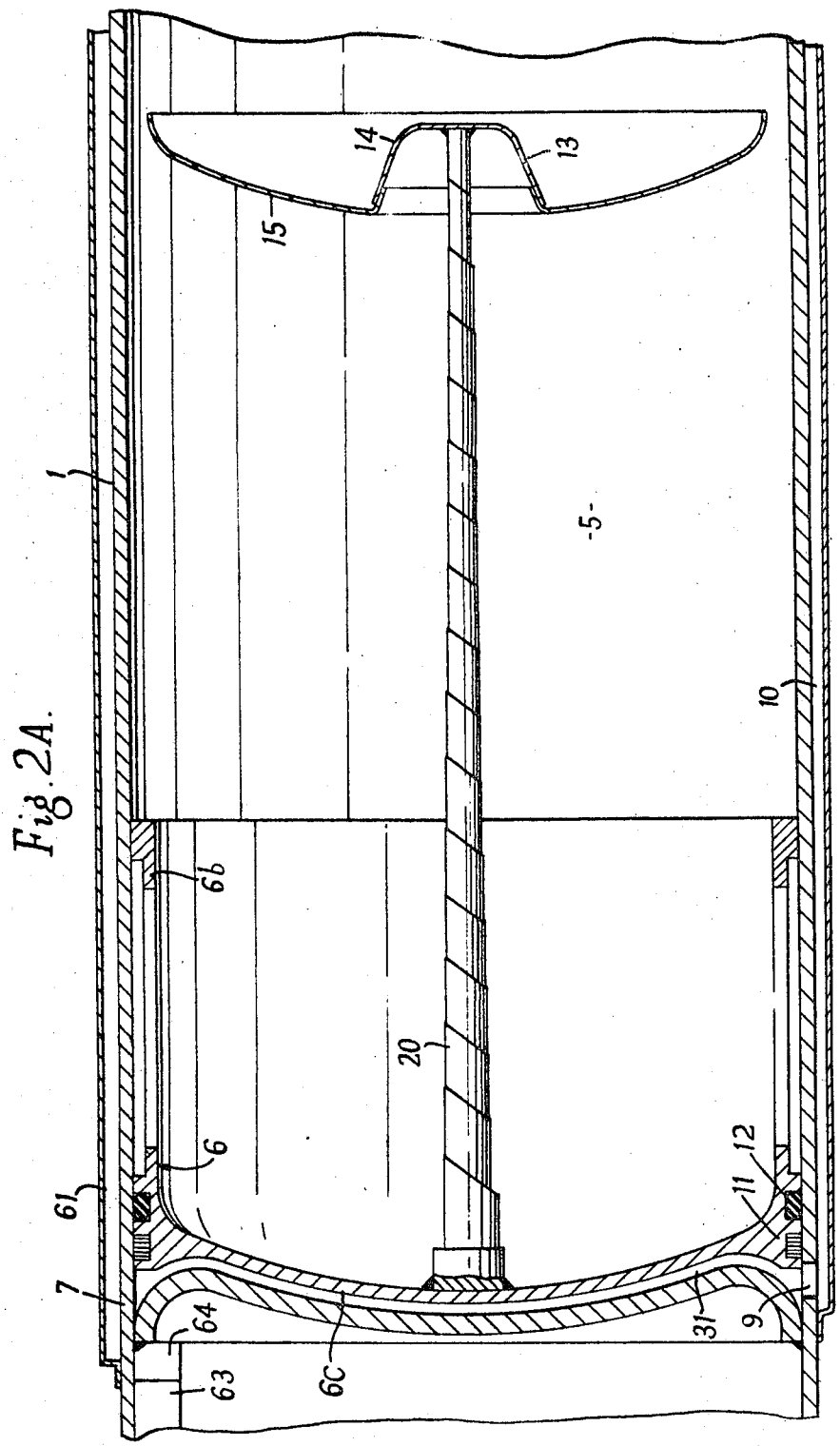
Figure 3:
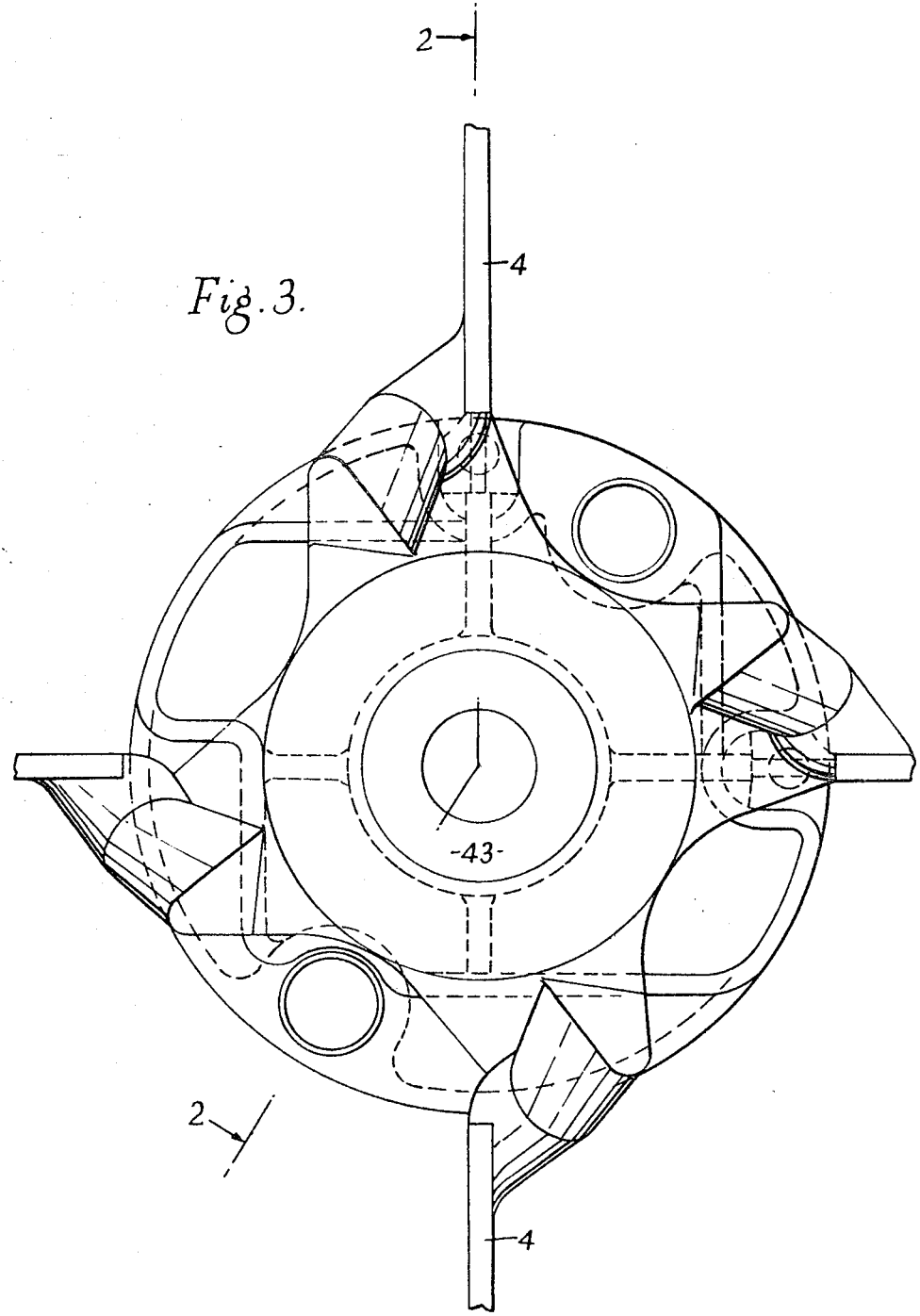

An embodiment of the invention will now be described with reference to the accompanying drawings, in which:

FIGURE 1 is an outline drawing, partly in axial section, of a rocket device incorporating one form of the invention, FIGURE 2, comprising FIGURES 2A and 2B taken together, is a somewhat fragmentary axial section, on line 2—2 of FIGURE 3, of the propulsion unit, FIGURE 3 is an end view, and FIGURE 4 is a section on line 4—4 of FIGURE 2B.

Referring now to the drawings, the illustrated rocket device has a substantially cylindrical shell 1 which at its front end carries a pay-load 2 and at its rear end a nozzle piece 3 to which a set of fins 4 are attached in such manner as to be foldable along the end portion of the shell 1, as shown at 4a in FIGURE 2B, for accommodation of the rocket device in an acceleration tube, but to assume and remain in the position shown in FIGURE 1, effectively rigidly connected with the nozzle piece 3, as soon as they leave this tube. The cylindrical shell 1 is partly shown in section in FIGURE 1 to disclose a cylindrical fuel-reservoir chamber 5 pressurised by means of a follower piston 6, and near its other end an auxiliary-equipment unit 7 whose leading end-portion 8 is dome-shaped to allow the walls of the cup-shaped follower piston 6 to occupy the space between this portion 8 and the shell 1 forming the wall of the reservoir 5. The elements of the rocket unit are shown in greater detail in FIGURES 2 to 4 and will now be described with reference to these figures.

FIGURE 2A shows the follower piston 6 at its initial position which it assumes when the reservoir is filled to capacity with monofuel, and it will be observed that the cylindrical shell 1 forming the wall of the reservoir 5 has a perforation 9 which in this position is just beyond the outer end of the piston 6, and which communicates with a pressurising passage 10 extending along the outer side of the reservoir wall. The piston 6 has sealing means indicated at 11 and 12, but it should be appreciated that since the piston 6 is a free-floating follower piston, the pressures at the two sides of the piston are always substantially equal. Since therefore there is little risk of appreciable leakage past the piston, a simple kind of seal is sufficient. The end wall 6c of the piston 6 carries at its inner side, facing the monofuel content of the reservoir 5, an abutment rod in the form of a telescopic spring 20, which is formed by a strip of spring material wound in a helical spiral so as to be compressible to a very small length, and the free end of the rod 20 carries a plug member 13, which is pierced by metering apertures 14, and which is surrounded by a steadying cap 15. This cap extends to near the circumferential wall 1 of the reservoir, and by thus preventing the plug 13 from moving too far away from the axis of the reservoir, it allows the use of a very soft spring incapable in itself of producing such centering effect.

When the piston 6 has reached a predetermined point in its travel, the plug 13 engages a socket or valve-seat member 16 provided, as shown in FIGURE 2B, at the centre of the dome-shaped member 8. This valve-seat member 16 contains the end of an inlet passage 1 to a Barske-type centrifugal pump 18. When the plug member 13 strikes the seat 16, it is in the position indicated in chain-dotted lines at 13a and effectively substitutes its metering apertures 14 for the much wider aperture of inlet passage 17, thereby restricting the rate of inlet flow to the pump 18 for a given pressure difference. An annular space 19, adapted to accommodate the skirt 6b of the follower piston 6, is provided between the reservoir wall 1 and the outer circumference of the dome-shaped member 8, and owing to the compressibility of the spring 20, the piston 6 can move up to a position shown at 6a, in which its end surface is only sufficiently spaced from the end of the dome-shaped member 6 to accommodate the guide member 15. In this position the skirt 6b of the piston substantially fills the annular chamber 19 so that nearly all the fuel in the reservoir is displaced.

The dome-shaped member 8 constitutes the front wall of the auxiliary-equipment chamber 7. This chamber contains, in addition to the Barske pump 18, an electric generator schematically indicated at 44, and a gas turbine 21, all having their rotors fixed on a common shaft. A partition 23, which is shown as integral with part of the housing of the turbine 21, separates the auxiliary-equipment chamber 7 from the decomposition chamber 24 for the liquid monofuel.

This decomposition chamber is somewhat smaller in cross-section than the cylindrical reservoir chamber 5 so as to allow a number of link members, one of which is shown at 25, and two starter cartridges, namely a cold-operating cartridge 26 and a hot-operating cartridge 27 (see FIGURE 4) to be accommodated in the cylindrical shell 1 outside the decomposition chamber 24. A discharge passage 28 from the cold cartridge 26 has one branch 29 leading through a bore 30 in the shell 1 to the pressurising passage 10 which leads to the chamber 31 at the outer side of the piston 6 and thus serves to pressurise the liquid monofuel in the reservoir 5, while another branch 32 of the discharge passage 28 leads to the inlet of the gas turbine 21 which drives the fuel pump 18 and also the electric generator 44. The exhaust gases of the turbine 21 are allowed to escape at the tail end of the unit by a nozzle 43 to contribute to its forward thrust.

A bore 33, provided in the wall of the turbine housing, leads from the interior of the decomposition chamber 24 into the branch passage 32 and thus to the turbine inlet, but this bore is initially closed by a frangible disc 34 supported at its side facing the combustion chamber by a grid 35 while on the opposite side only the rim of the disc is supported by an annular insert 36. Immediately after the firing of the cartridge 26 the disc 34 will prevent the escape of gas from the branch passage 32 into the decomposition chamber 24, thus preventing contamination of the air in chamber 24 and making it unnecessary to build up pressure in this chamber from the combustion gases of the cartridge before the turbine 21 can be effectively driven. As soon as the pressure in the chamber 24 exceeds the pressure supplied through passage 28 from the cartridge 26, the disc 34 will be fractured so as to permit access of gases from the decomposition chamber 24 to the turbine.

Operation of the turbine will drive the pump 18, to which fuel has free access through the passage 17, and will superimpose a dynamically produced pressure upon the pressure applied to the fuel by the pressurisation of the chamber 31. That chamber has been pressurised by combustion gases from the cold cartridge 26 admitted through passages 29 and 10. Referring now to FIGURE 4, monofuel delivered by the pump 18 has free access to two delivery passages 37 and 38 leading respectively to a large-capacity atomiser injection nozzle 39 and to a small-capacity atomiser injection nozzle 40, both projecting into the decomposition chamber 24.

Fuel will thus be injected into the chamber 24, which at this time is still filled with air under atmospheric pressure, and the spray from the large-capacity nozzle 39 will strike a hot-spot ignition body 62 which by this time has been adequately heated by combustion gases of the hot cartridge 27, which is fired simultaneously with the cold cartridge 26. Combustion in the chamber 24 will therefore now commence as true combustion, utilising the air contained in the chamber 24. Due to this combustion the pressure in chamber 24 will rapidly rise to a value sufficient to sustain combustive decomposition of the monofuel subsequently injected. When this stage has been reached, the pressure in chamber 24 will also be sufficient to rupture the frangible disc 34, whereafter operation of the fuel pump 18 and pressurisation of chamber 31 via lines 29 and 10 are ensured by gases from the decomposition chamber 24. The pressure will also rupture a further frangible disc 42, which up to this moment has prevented gases from chamber 24 from reaching the main propulsion nozzle 43 of the unit.

The nozzle piece 3 containing this nozzle forms a cradle carrying the four radially disposed axial fins 4, and it is capable of pivotal movement about a ball-joint 45 under the control of axially disposed actuators arranged in two radial planes displaced by 90° about the longitudinal axis of the shell. The actuators, one of which is visible in FIGURE 2B, are of similar construction to each other. Each includes an actuator cylinder 46 adapted for two-directional action under joint control from the ground and from a gyroscopic device not shown, the piston of each cylinder being connected to the nozzle-piece cradle 3 by one of the above-mentioned link rods 25, and the linkage also includes a feedback member 47.

Positive positional control is achieved by the use of hydraulic operation for the cylinder 46. The delivery of the Barske pump 18 is used as a source of high-pressure liquid, while the actuator exhaust is returned to the reservoir 5, so that the dynamic pressure of the pump 18 is available for the actuation of the cylinder. As a result no separate hydraulic power plant is required and no loss of fuel from the reservoir is involved. It will be appreciated that by the use of the swivel cradle 3 which contains the propulsion nozzle 43 or nozzles as well as a set of radially extending fins 4, control of the rocket unit is greatly simplified since at the beginning of the flight, when the speed of travel is low, the nozzle thrust is high, so that the deflection of the direction of thrust ensures effective steering, while in the later stages, when the speed of travel is high and the thrust is greatly reduced, the same steering operation will produce effective steering forces due to the action of the fins, which are deflected simultaneously with the nozzle, while, in view of the reduction of the thrust, the steering effect of diversion of the jet stream has become somewhat less. It will also be appreciated that this steering arrangement is not limited to rockets using a liquid monofuel propellant, and will also offer advantages in rockets in which the propulsion jet is active only during part of the travel, some other source of power being available for control operations during the later stages of the flight in which the steering effect will be provided by the fins. As indicated in FIGURE 2B at 4a by chain-dotted lines, the fins 4 can be folded alongside the cylindrical shell 1 of the rocket unit.

While modern monofuels, and in particular isopropyl nitrate, will decompose and develop heat within a considerable pressure range, the reduction in the rate of fuel supply from the initial acceleration stage to the subsequent cruising stage of the rocket unit, which may for example be at a ratio of 6:1, would involve the risk of a fall in decomposition-chamber pressure below the minimum pressure which ensures continued decomposition, if under cruising conditions free access of decomposition gases to the nozzle 43 were continued to be permitted. For this reason an obturator member 48 having metering perforations 49 co-operates with a seat 50 at the entrance to the nozzle 43, closely adjacent to the point at which this entrance is, during the initial pressurising stage of the unit, closed by the burster disc 42. The obturator member 48, which is urged on to its seat by a spring 54 of a strength sufficient to maintain the obturator on its seat against a pressure somewhat higher than the minimum pressure ensuring reliable decomposition of the monofuel in the chamber 24, has a stem 51 which slides in an axially extending cylinder 52 one end of which communicates with the external atmosphere by an atmospheric pipe 53. During the initial pressurising stage therefore, as the pressure in the chamber 24 rises due to the initial combustion and/or subsequent decomposition of monofuel in the chamber 24, this rising pressure will act on the cross-sectional area of the stem 51 against atmospheric pressure and the force of the spring 54 and will, before the disc 42 is broken, move the obturator 48 from its illustrated seated position into an inoperative position away from its seat 50 and will keep the obturator in this inoperative position during the high-thrust accelation stage of the rocket operation. When thereafter the rate of combustion decreases and the pressure in the chamber 24 begins to fall, the obturator will return, under the action of the spring 54, to its illustrated seated position before the pressure has fallen to a value so low as to endanger continued decomposition of the monofuel. As soon as the obturator has reached its seat 50, decomposition gases from chamber 24 can reach the propulsion nozzle 43 only through the restricted metering orifices 49, whose size is so chosen as to ensure maintenance of a pressure sufficient for the reliable decomposition with the rate of fuel supply then applicable.

Another risk might be involved by the reduction of the fuel supply to a fraction of its initial valve at the end of the high-thrust acceleration stage. It is that the rate of passage of fuel through the atomizer nozzles 39 and 40 might be too low to ensure efficient atomization. For this reason means are provided which in these circumstances automatically shut off the high-capacity nozzle 39, so that during the cruising stage all the monofuel supplied by the pump 18 must pass through the low-capacity nozzle 40 which, for example, may have one-fifth of the capacity of the nozzle 39 or one-sixth of the combined capacity of the two nozzles. Cutting-off of the fuel supply through nozzle 39 is effected by a plug 55, FIGURE 4, having a cylindrical portion which is slidable in the inlet portion 56 of the associated delivery line from the illustrated initial position, in which the plug 55 is clear of the pump delivery outlet 57, to a position in which the cylindrical portion of the plug 55 completely closes this outlet, a weak shear pin 58 being provided to prevent accidental movement of the plug 55 from its initial position.

While various means may be employed for effecting the transfer of the plug 55 from the illustrated to the closed position, it is proposed to utilise hydrodynamic action in the pump 18 due to the sudden restriction in its inlet upon the closure of the obturator 48. This, while requiring a minimum of complication, avoids the need of any perforation of the bell housing 8 which isolates the fuel-reservoir chamber 5 from the auxiliary-equipment section of the rocket housing. With this object in view the rear face of plug 55 communicates with the pump delivery by a line 59 which leads to the low capacity nozzle 40, and which is arranged diametrically opposite in the pump housing to the outlet 57 leading to the high-capacity nozzle 39. When the rate of admission of monofuel to the centrifugal pump 18 is decreased, this will cause the chambers between the impeller blades of the pump to be only partly filled with liquid, leaving a central core of the pump filled with vapour only, and reducing the amount of liquid in the pump to an annular body of a certain radical thickness. At the moment when the supply is suddenly reduced however, the pump impeller is still fully filled with liquid, and this body of liquid is sub-divided radially by the impeller blades. It will be readily appreciated that the radial thickness will decrease more rapidly in those chambers which communicate with the large-capacity outlet, due to the higher rate of flow from these chambers than those which communicate with the low-capacity outlet, thus creating a momentary difference in pressure between the two outlets. This momentary difference in pressure is sufficient to break the weak shear pin 58 and move the plunger 55 to the cut-off position. Once this position has been reached, pump delivery pressure will no longer act on the side of the plunger which faces the nozzle 39, so that even when the pressure difference between the two outlets disappears, there will be a continuous excess force acting on the outer side of the plunger 55 to retain it in the cut-off position. From this moment therefore all the liquid delivered by the pump 18 is forced to pass through the small capacity nozzle 40, thus ensuring reliable atomisation.

In order to maintaen the rocket on its straight course in the absence of external control impulses, a gyroscopic device 63 (see FIGURE 2A) is incorporated in the rocket, and in order to make this device effective, it is necessary for the gyroscope or gyroscopes to be raised to a suitable speed of rotation at the moment when the rocket is fired. This is effected by an auxiliary turbine 64 which is driven by gas from the hot cartridge 27, this gas being for this purpose, conducted, after passing the ignition hot spot 40, through a bore 60 in the shell 1 and an external duct 61, in which the cartridge gases are sufficiently cooled to reduce their temperature to a value tolerated by the turbine blading.

In a rocket unit it is obviously desirable to allow only a minimum capacity for the fuel chamber in order to keep the overall size of the rocket unit as small as possible, and it will be appreciated that this tendency will be assisted in the present invention by the fact that when the fuel delivery rate decreases, the resultant decrease in decomposition-chamber pressure is reduced by limiting the outlet cross-section and the means for maintaining efficient atomisation, and it is believed that some further reduction of the chamber capacity may be permissible if a minimum dwell time for each particle of atomised fuel is ensured by the insertion of a spiral and/or helical baffle in the decomposition chamber, thus ensuring at least a predetermined minimum length of path for each particle between its point of injection and its admission to the thrust nozzle.

It will also be appreciated by those skilled in the art that various features of the invention may be used independently of one or more of the other features of the illustrated embodiment, and in some cases in rockets other than those employing a liquid monofuel and different rates of combustion during two stages of flight.

I claim:

1. A rocket propulsion unit of the kind having a storage reservoir for liquid monofuel, a decomposition chamber, means, including a follower piston movable in said reservoir, for pressurising such monofuel in the reservoir, and means for injecting monofuel from the reservoir into the decomposition chamber and for initially pressurising the decomposition chamber by igniting the monofuel in the air present in that chamber, a propulsion nozzle for the emission of combustion and decomposition gases from the said chamber, said unit incorporating a fuel supply control element operated by said follower piston when the volume of monofuel in the reservoir has fallen to a predetermined value and effective when thus operated to reduce the rate of monofuel supply to the decomposition chamber while maintaining a residual rate of supply at least sufficient to permit the performance of steering operations.

2. A rocket-propulsion unit as claimed in claim 1, further including a turbine operated by gas under pressure from the combustion chamber to drive auxiliary apparatus, said residual rate of monofuel supply being sufficient to permit not only the performance of steering operations but also the operation of said turbine.

3. A rocket propulsion unit as claimed in claim 2, wherein said auxiliary apparatus includes a fuel-pressure increasing pump and an electric generator.

4. A rocket propulsion unit as claimed in claim 1, and including means arranged to come into operation when the rate of monofuel supply is thus reduced, and which reduce the effective jet-nozzle aperture.

5. A rocket propulsion unit as claimed in claim 4, wherein said nozzle-aperture reducing means are operative to interpose a restriction between the decomposition chamber and the nozzle inlet of the jet nozzle.

6. A rocket propulsion unit as claimed in claim 1, wherein the means for injecting monofuel from the reservoir into the decomposition chamber includes a dynamic pump, a gas turbine driving said pump, and means for supplying gas from the decomposition chamber to drive said turbine when monofuel is being decomposed.

7. A rocket propulsion unit as claimed in claim 6, which includes a pressurising piston arranged in the reservoir and a pressure connection from the decompostion chamber to the reservoir at the outer side of said piston for pressurising the reservoir when monofuel is being decomposed and means for accommodating a starter cartridge so arranged in the rocket unit that when ignited it supplies combustion gases to the turbine and to the reservoir at the outer side of said piston to initiate the supply of fuel to the decomposition chamber.

8. A rocket propulsion unit as claimed in claim 7, including a one-way locking device interposed between the gas-turbine inlet and the decomposition chamber to prevent flow of cartridge combustion gases into the decomposition chamber but to permit flow from that chamber to the gas turbine when the pressure in the decomposition chamber exceeds the pressure at said turbine inlet.

9. A rocket propulsion unit as claimed in claim 8, including a hot-spot ignition device operable to initiate combustion of monofuel in the decomposition chamber before decomposition conditions are achieved.

10. A rocket propulsion unit as claimed in claim 6, wherein the pressurising piston is equipped at its side facing the monofuel with a spring loaded telescopically collapsible abutment rod which when the follower piston reaches a predetermined position, co-operates with a valve seat to restrict the admission of monofuel to the inlet of the turbine-driven centrifugal pump.

11. A rocket propulsion unit as claimed in claim 10, which includes an automatic restrictor device operative to reduce the propulsion-nozzle inlet area in response to a drop in decomposition-chamber pressure.

12. A rocket propulsion unit as claimed in claim 11, including variable-area nozzle means interposed between the reservoir and the decomposition chamber, and means automatically reducing the effective nozzle of area of said nozzle means when the fuel admission of the pump is restricted.

13. A rocket propulsion unit as claimed in claim 8, further comprising means for accommodating a hot cartridge and for igniting said hot cartridge and said starter cartridge simultaneously, a hot-spot ignition element in the decomposition chamber and passage means causing the hot gases from said hot cartridge to heat said ignition element without entering the decomposition chamber.

14. A rocket propulsion unit as claimed in claim 1, wherein said monofuel-supply reducing means are operative in response to the consumption of a predetermined amount of monofuel.

References Cited

UNITED STATES PATENTS

| | | | |
|---|---|---|---|
| 2,868,478 | 1/1959 | McCloughy | 60—232 X |
| 2,870,603 | 1/1959 | Long | 60—257 |
| 2,949,006 | 8/1960 | Halliday | 60—212 |
| 2,955,649 | 10/1960 | Hoffman et al. | 60—259 X |
| 2,971,097 | 2/1961 | Corbett | 60—39.48 X |
| 3,010,279 | 11/1961 | Mullen et al. | 60—218 |

FOREIGN PATENTS 771,896   4/1957   Great Britain.

VERLIN R. PENDEGRASS, *Primary Examiner.*

U.S. Cl. X.R.

244—3.22